United States Patent
Cho et al.

(10) Patent No.: US 7,227,830 B2
(45) Date of Patent: Jun. 5, 2007

(54) DIELECTRIC RECORDING APPARATUS, DIELECTRIC REPRODUCING APPARATUS, AND DIELECTRIC RECORDING / REPRODUCING APPARATUS

(75) Inventors: Yasuo Cho, 4-5-304, Komegafukuro 2-chome, Aoba-ku, Sendai-shi, Miyagi (JP); Atsushi Onoe, Saitama (JP)

(73) Assignees: Yasuo Cho, Miyagi (JP); Pioneer Corporation, Tokyo (JP)

( * ) Notice: Subject to any disclaimer, the term of this patent is extended or adjusted under 35 U.S.C. 154(b) by 722 days.

(21) Appl. No.: 10/657,715

(22) Filed: Sep. 9, 2003

(65) Prior Publication Data

US 2004/0090903 A1    May 13, 2004

(30) Foreign Application Priority Data

Sep. 11, 2002   (JP) .............................. 2002-265930

(51) Int. Cl.
*G11B 9/00* (2006.01)
(52) U.S. Cl. ..................................................... 369/126
(58) Field of Classification Search ................ 369/126, 369/47.1, 53.1, 124.1, 276, 13.38, 275.4, 369/275.3, 53.38; 977/947; 428/846.1, 428/141, 336; 324/457, 113
See application file for complete search history.

(56) References Cited

U.S. PATENT DOCUMENTS

| 4,320,491 A | 3/1982 | Rustman ...................... 369/126 |
| 4,489,278 A | 12/1984 | Sawazaki et al. |
| 5,418,029 A | 5/1995 | Yamamoto et al. ......... 428/64.2 |
| 5,481,527 A | 1/1996 | Kasanuki et al. ........... 369/126 |
| 5,488,602 A | 1/1996 | Yamano et al. ............. 369/126 |
| 5,646,932 A | 7/1997 | Kuribayashi et al. ....... 369/126 |
| 5,751,685 A | 5/1998 | Yi ............................... 369/126 |

(Continued)

FOREIGN PATENT DOCUMENTS

EP    1 369 864 A    12/2003

(Continued)

OTHER PUBLICATIONS

62th Japan Society of Applied Physics Lecture Meeting (2001.9 Aichi Institute of Technology) 12p-ZR-2.

(Continued)

*Primary Examiner*—Ali Neyzari
(74) *Attorney, Agent, or Firm*—Nixon & Vanderhye, PC (57) ABSTRACT

A dielectric recording/reproducing apparatus is provided with: a probe for applying an electric field to a dielectric material; a return electrode for returning the high frequency electric field for data reproduction; an inductor placed between the probe and the return electrode; an oscillator which oscillates at a resonance frequency determined according to the inductor and a capacitance formed in the dielectric material just under the probe; a switch for switching circuit connections depending on whether data recording is performed and data reproducing is performed; a recording signal input device for converting data to be recorded to generate a recording signal; a direct current voltage generation device for generating a direct current bias voltage to be applied to the dielectric material; a frequency-amplitude demodulator for demodulating an oscillation signal of the oscillator having the frequency that is changed depending on the capacitance owned by the dielectric material just under the probe; and a signal detector for detecting data from the demodulated signal.

21 Claims, 9 Drawing Sheets

U.S. PATENT DOCUMENTS

| | | | |
|---|---|---|---|
| 5,777,977 A | 7/1998 | Fujiwara et al. | |
| 5,808,977 A | 9/1998 | Koyanagi et al. | 369/127 |
| 5,914,920 A | 6/1999 | Yokogawa | 369/275.3 |
| 5,946,284 A | 8/1999 | Chung et al. | 369/126 |
| 5,985,404 A | 11/1999 | Yano et al. | |
| 6,197,989 B1 | 3/2001 | Furukawa et al. | 556/450 |
| 6,477,132 B1 * | 11/2002 | Azuma et al. | 369/126 |
| 6,510,130 B2 | 1/2003 | Hayashi et al. | 369/275.3 |
| 6,515,957 B1 | 2/2003 | Newns et al. | 369/126 |
| 6,653,630 B2 | 11/2003 | Rosenman et al. | 250/306 |
| 6,762,402 B2 | 7/2004 | Choi et al. | 250/234 |
| 6,841,220 B2 | 1/2005 | Onoe et al. | 428/66.7 |
| 6,912,193 B2 | 6/2005 | Cho et al. | 369/126 |
| 6,965,545 B2 | 11/2005 | Hino et al. | 369/13.54 |
| 7,065,033 B2 | 6/2006 | Onoe et al. | 369/126 |
| 7,149,180 B2 | 12/2006 | Onoe et al. | 369/276 |
| 2002/0105249 A1 | 8/2002 | Yoshida et al. | 310/311 |
| 2002/0118906 A1 | 8/2002 | Onoe | 385/14 |
| 2002/0131669 A1 | 9/2002 | Onoe et al. | 385/14 |
| 2003/0021213 A1 | 1/2003 | Hagiwara | 369/126 |
| 2003/0053400 A1 | 3/2003 | Cho et al. | 369/126 |
| 2004/0027935 A1 | 2/2004 | Cho et al. | 369/126 |
| 2004/0042351 A1 | 3/2004 | Onoe et al. | 369/13.01 |
| 2004/0090903 A1 | 5/2004 | Cho et al. | 369/126 |
| 2004/0105373 A1 | 6/2004 | Maeda et al. | 369/101 |
| 2004/0105380 A1 | 6/2004 | Cho et al. | 369/126 |
| 2004/0114913 A1 | 6/2004 | Kume | 386/125 |
| 2004/0246879 A1 | 12/2004 | Onoe et al. | |
| 2004/0252621 A1 | 12/2004 | Cho et al. | 369/126 |
| 2004/0263185 A1 | 12/2004 | Cho et al. | 324/636 |
| 2005/0047288 A1 | 3/2005 | Maeda et al. | 369/53.25 |
| 2005/0098532 A1 | 5/2005 | Onoe et al. | 216/22 |
| 2005/0099895 A1 | 5/2005 | Maeda et al. | 369/13.01 |
| 2005/0122886 A1 | 6/2005 | Takahashi et al. | 369/126 |

FOREIGN PATENT DOCUMENTS

| | | |
|---|---|---|
| EP | 1 381 042 A | 1/2004 |
| GB | 1 484 256 | 9/1977 |
| JP | 56-107338 | 8/1981 |
| JP | 57-200956 | 12/1982 |
| JP | 08-075806 | 3/1996 |
| JP | 09-097457 | 4/1997 |
| JP | 09-153235 | 6/1997 |
| JP | 10-334525 | 12/1998 |
| JP | 2003085969 | 3/2003 |

OTHER PUBLICATIONS

Kazuta et al, "Determination of crystal polarities of piezoelectric thin film using scanning nonlinear dielectric microscopy", Journal of European Ceramic Society 21 (2001) 1581-1584.

The Institution of Electrical Engineers, Stevenage, GB; Jun. 1, 2002; Hiranaga et al, "Nano-sized domain formation in stoichiometric LiTaO/sub3/single crystal using Scanning Nonlinear Dielectric Microscopy", XP002292217.

Cho et al, "Scanning nonlinear dielectric microscopy with nanometer resolution", Journal of European Ceramic Society 21 (2001) 2131-2134.

Cho et al., Nano domain engineering using scanning nonlinear dielectric microscopy, Oct. 29, 2001, IEE-NANO 2001, pp. 352-357.

Hiranaga et al, "Nano-Sized Inverted Domain Formation in Stoichiometric Lita03 Single Crystal Using Scanning Nonlinear Dielectric Microscopy", Integrated Ferroelectrics, New York, NY, vol. 49, May 1, 2002, pp. 203-209, XP009035260.

* cited by examiner

DIELECTRIC RECORDING APPARATUS, DIELECTRIC REPRODUCING APPARATUS, AND DIELECTRIC RECORDING / REPRODUCING APPARATUS

BACKGROUND OF THE INVENTION

1. Field of the Invention

The present invention relates to a dielectric recording apparatus, a dielectric reproducing apparatus, and a dielectric recording/reproducing apparatus for recording/reproducing information with high density in/from microdomains in a dielectric substance.

2. Description of the Related Art

As high-density, large-capacity recording/reproducing apparatuses of randomly accessible type, there are known an optical disc apparatus and a hard disc drive (HDD) apparatus. Moreover, a recording/reproducing technique using a scanning nonlinear dielectric microscopy (SNDM) for the nanoscale analysis of a dielectric (ferroelectric) material has been recently proposed by the inventors of the present invention.

In optical recording, which uses an optical pickup with a laser as a light source, data is recorded by forming pits that are concave-convex on a disc surface or forming a crystal phase or amorphous phase of a phase shift medium, and the data is reproduced by using the difference in the reflectance between the crystal phase and the amorphous phase or using the magneto optical effect. However, the pickup is relatively large, which is not appropriate for high-speed reading, and the size of the recording pit is defined by the diffraction limit of light, so that its recording density is limited to 50 G bit/inch$^2$.

In the longitudinal recording of magnetic recording as represented by the HDD, a magnetic resistance (MR) head has been recently realized by using giant magnetic resistance (GMR), and its recording density is expected to be larger than that of the optical disc by using perpendicular magnetic recording. However, the recording density is limited to 1 T bit/inch$^2$ because of thermal fluctuation of magnetic recording information and the presence of a Bloch wall in a portion in which a code is reversed. Even if patterned media are used considering the above cause, it is difficult to overcome this limit.

The SNDM can detect the plus and minus of a ferroelectric domain by measuring a non-linear dielectric constant of a ferroelectric material. The SNDM can perform the detection of the ferroelectric domain in sub-nanometer resolution by using an electrically conductive cantilever (or probe) provided with a small projection on its tip portion, which is used for an atomic force microscopy (AFM) or the like. In the SNDM, a resonance circuit is used for the detection of the ferroelectric domain. The resonance circuit is provided with a probe(s), an inductor, an oscillator and a return electrode. The oscillation in the resonance circuit generates a high frequency signal having a frequency determined by an inductance of the inductor and a capacitance of a ferroelectric material just under the tip portion of the probe. The high frequency signal is applied from the tip portion of the probe to the ferroelectric material and returns from the ferroelectric material to the resonance circuit through the return electrode placed near the tip portion of the probe. The differential capacitance of the ferroelectric material changes depending on the non-linear dielectric constant of the ferroelectric material. The resonance circuit converts the change of the differential capacitance into the change of the frequency of the high frequency signal. Namely, the resonance circuit performs frequency modulation. Then, frequency-amplitude conversion is performed on the frequency-modulated signal. Then, coherent detection is performed on the converted signal by using a lock-in amplifier or the like, so that information corresponding to the differential capacitance of the ferroelectric material is extracted. On the basis of the extracted information, the plus and minus of the ferroelectric domain is detected.

However, the SNDM is originally designed for an analysis apparatus. The SNDM has not been developed in view of a recording/reproducing apparatus. For example, in the SNDM analysis apparatus, a relatively low alternating current electric field is applied to the dielectric material, in order to convert the change of the differential capacitance of the dielectric material into the change of the frequency of the high frequency signal. Namely, this conversion is carried out in the situation that the alternating current electric field is being applied to the dielectric material. Because of this, an oscillator for generating the alternating current electric field is needed. As a result, it is difficult to reduce the size of the apparatus and the production cost of the apparatus. Furthermore, the rate of the data reproduction is restricted by the frequency of the alternating current electric field. The frequency of the alternating current electric field is relatively low. As a result, it is difficult to increase the rate of the data reproduction.

SUMMARY OF THE INVENTION

It is therefore an object of the present invention to provide a dielectric recording apparatus, a dielectric reproducing apparatus, and a dielectric recording/reproducing apparatus for recording/reproducing data in/from a dielectric recording medium by using the SNDM, on which high-speed recording/reproducing can be performed and which are small and inexpensive.

The above object of the present invention can be achieved by a dielectric recording apparatus for recording data in a dielectric material, provided with: a probe for recording the data in the dielectric material; a record data voltage generation device for generating a voltage corresponding to the data; a bias voltage generation device for generating a bias voltage which is applied to the dielectric material; and a voltage application device for combining the voltage corresponding to the data and the bias voltage and applying the combined voltage to the probe.

The polarization direction of the dielectric material (ferroelectric material) is inverted by applying an electric field greater than the coercive electric field of the dielectric material. The data can be recorded in the dielectric material by using this property. The dielectric apparatus of the present invention uses this principle.

In the dielectric recording apparatus of the present invention, data is recorded by combining a voltage corresponding to the data to be recorded and a direct current (DC) voltage for bias, applying the combined voltage to the probe for recording data in the dielectric material, and polarizing domains in the dielectric material just under the probe to be in predetermined directions by an electric field caused by the applied voltage.

The voltage corresponding to the data to be recorded is pulse if the data is binary digital data. The intensity of the DC voltage for bias is set so as to be equal to or smaller than the intensity of the coercive electric field of the dielectric material. In this case, the combined voltage is a biased pulse. In this combined voltage, the intensity of only the high level of the pulse exceeds the intensity of the coercive electric field of the dielectric material.

In order to combine the voltage corresponding to the data to be recorded and the DC voltage for bias, an adder or the like including an operational amplifier may be used. With respect to the DC voltage for bias, both plus and minus polarity can be used, and its polarity is determined depending on the polarization direction corresponding to the data to be recorded in the dielectric material. Namely, if data is recorded in a recording medium which is initialized to have a plus surface, the application of a minus voltage is required for the recording of data. In this case, a minus bias voltage is applied.

In the combined voltage, the voltage of the high level of the pulse becomes large, since the pulse corresponding to the data to be recorded is biased by the DC voltage. The large electric field can be locally generated in the dielectric material by applying the combined voltage. Therefore, the polarization direction of the dielectric material can be quickly inverted. Consequently, high-speed recording operation can be achieved. Moreover, the use of the DC voltage for bias facilitates the construction of a circuit and allows its miniaturization. Furthermore, because of the miniaturization, the relative position movement of the probe and the dielectric material, which is a recording medium, can take not only a mode of moving the dielectric medium with respect to the probe, such as rotational movement, but also a mode of moving a reproducing head including the probe with respect to the recording medium, such as linear movement in an X-Y plane.

The above object of the present invention can be achieved by a dielectric reproducing apparatus for reproducing data recorded in a dielectric material, provided with: a probe for detecting a polarization state of the dielectric material corresponding to the data; a data reproduction device for reproducing the data from the polarization state detected by the probe; a bias voltage generation device for generating a bias voltage which is applied to the dielectric material; and a voltage application device for applying the bias voltage to the dielectric material.

The dielectric reproducing apparatus is based on a principle explained hereinafter. Data is recorded in the dielectric material (ferroelectric material) as polarization directions of the dielectric material. The nonlinear dielectric constant differs depending on whether the polarization direction of the dielectric material is plus or minus. The difference in the nonlinear dielectric constant can be recognized by detecting the difference in the capacitance of the dielectric material in the situation that a direct current voltage is being applied to the dielectric material. For example, in the situation that a plus direct current voltage is being applied to the dielectric material, the capacitance when the polarization direction is plus is smaller than the capacitance when the polarization direction is minus. Therefore, if the signal that indicates the capacitance of the dielectric material is generated in the situation that direct current voltage is being applied, the polarization direction of the dielectric material can be recognized on the basis of this signal, and the data recorded in the dielectric material can be reproduced. Incidentally, the direct current voltage to be applied for the detection of the capacitance of the dielectric material is set in such a condition that the electric field generated in the dielectric material by applying this direct current voltage is not more than the coercive electric field of the dielectric material.

In the dielectric reproducing apparatus of the present invention, a DC voltage is applied, as a voltage for bias, to the dielectric material for reproducing data recorded in the dielectric material. Then the data is reproduced by the data reproduction device by detecting the capacitance of the dielectric material corresponding to the polarization state just under the probe. For example, the detection of the capacitance of the dielectric material may be performed by using an oscillation circuit formed of the capacitance of the dielectric material just under the probe and of an inductor. In the oscillation circuit, the oscillation frequency is determined by the capacitance of the dielectric material just under the probe and the inductance of the inductor. Since the difference of the capacitance corresponds to the difference of the polarization direction of the dielectric material, the oscillation frequency is changed depending on the polarization direction of the dielectric material. By converting the change of the oscillation frequency into the change of the amplitude of a pulse signal (by performing a frequency-amplitude conversion), the data can be reproduced on the basis of this pulse signal. With respect to the DC voltage for bias, both plus and minus polarity can be used.

By applying the DC voltage to the dielectric material in order to reproduce the data, the data can be reproduced in a good SN ratio and at high speed. The dielectric reproducing apparatus is based on the SNDM. The SNDM is developed as a method of analyzing the polarization state of the dielectric material. In an analyzing apparatus using the SNDM, the alternating current (AC) voltage is applied to the dielectric material in order to analyze the polarization state of the dielectric material. On the other hand, in a data reproducing apparatus using the SNDM, if the data is reproduced from the dielectric material by applying the AC voltage, the speed of the data reproduction process is restricted depending on the frequency of the AC voltage. However, in the dielectric reproducing apparatus of the present invention, the data is reproduced by applying the DC voltage. Therefore, high speed data reproduction process can be achieved. Further, the use of the DC voltage in place of the AC voltage can make the construction of the circuits for the data reproduction simple and miniaturize it. Furthermore, because of the miniaturization, the relative position movement of the probe and the dielectric material, which is a recording medium, can take not only a mode of moving the dielectric medium with respect to the probe, such as rotational movement, but also a mode of moving a reproducing head including the probe with respect to the recording medium, such as linear movement in an X-Y plane.

The above object of the present invention can be achieved by a dielectric recording/reproducing apparatus for performing data recording and data reproducing by using a dielectric material as a recording medium, provided with: a probe for recording data to be recorded in the dielectric material and for detecting a polarization state of the dielectric material corresponding to data recorded in the dielectric material; a record data voltage generation device for generating a recording voltage corresponding to the data to be recorded; a data reproduction device for reproducing the data recorded in the dielectric material on the basis of the polarization state detected by the probe; a bias voltage generation device for generating a bias voltage which is applied to the dielectric material; and a voltage application device for applying the bias voltage to the dielectric material.

According to the dielectric recording/reproducing apparatus of the present invention, in recording data, the data is recorded by combining a voltage corresponding to the data to be recorded and a DC voltage for bias, applying the combined voltage to the probe for recording data in the dielectric material, and polarizing domains in the dielectric material just under the probe by an electric field caused by the applied voltage. In order to combine the voltage corresponding to the data to be recorded and the DC voltage for bias, an adder or the like including an operational amplifier is used. With respect to the DC voltage for bias, both plus and minus polarity can be used, and its polarity is determined depending on the polarization direction corresponding to the data which is recorded in the dielectric material. On the other hand, in reproducing the recorded data, the DC voltage is applied, as a voltage for bias, to the dielectric material just under the probe for reproducing data recorded in the dielectric material. Then the data is reproduced by detecting the difference of the capacitance of the dielectric material corresponding to the difference of the polarization direction of the dielectric material. With respect to the DC voltage for bias, both plus and minus polarity can be used. Incidentally, the probe and the bias voltage generation device are shared for recording and reproducing. Alternatively, a probe(s) and a bias voltage generation device exclusively used for the data recording and another probe(s) and another bias voltage generation device exclusively used for the data reproduction may be prepared.

By applying the DC voltage to the dielectric material, the data can be recorded and reproduced at high speed. Further, the use of the DC voltage in place of the AC voltage can make the construction of the circuits for the data reproduction simple and miniaturize it. Furthermore, because of the miniaturization, the relative position movement of the probe and the dielectric material, which is a recording medium, can take not only a mode of moving the dielectric medium with respect to the probe, such as rotational movement, but also a mode of moving a reproducing head including the probe with respect to the recording medium, such as linear movement in an X-Y plane.

In one aspect of the dielectric reproducing apparatus, dielectric recording apparatus, and dielectric recording/reproducing apparatus of the present invention, the bias voltage generation device includes a voltage-value setting device for changing and setting a value of the bias voltage.

According to this aspect, it is possible to set a DC voltage as being a bias voltage to an appropriate value for the dielectric material.

In another aspect of the dielectric reproducing apparatus, dielectric recording apparatus, and dielectric recording/reproducing apparatus of the present invention, the bias voltage generation device includes a reversing device for reversing polarity of the bias voltage.

According to this aspect, it is possible to set the polarity of a DC voltage as being a bias voltage in accordance with a direction to polarize.

In another aspect of the dielectric reproducing apparatus and dielectric recording/reproducing apparatus of the present invention, the data reproduction device reproduces the data by detecting a capacitance of the dielectric material corresponding to the polarization state with the probe. More concretely, it is preferable that the data reproduction device may be configured so as to have: an oscillator for generating an oscillation signal having a frequency that changes depending on a capacitance of the dielectric material corresponding to the polarization state detected by the probe; and a converting device for performing a frequency-amplitude conversion on the oscillation signal.

As mentioned above, in the situation that the data is recorded in the dielectric material as the polarization states, the capacitance of the dielectric material differs depending on the polarization state corresponding to the recorded data. If the data is binary digital data with "0" and "1", the data is recorded as plus or minus of the polarization direction of the dielectric material. Therefore, the capacitance of the dielectric material is determined at one of two values. The oscillator generates the oscillation signal having the frequency that changes depending on the capacitance of the dielectric material. The frequency of the oscillation signal has two kinds of frequencies. The converting device performs a frequency-amplitude conversion on the oscillation signal. As a result, a pulse signal having two levels corresponding to the binary digital data recorded in the dielectric material can be obtained. On the basis of this pulse signal, the data can be reproduced.

In another aspect of the dielectric recording/reproducing apparatus of the present invention, a switching device for switching between a first line for sending the recording voltage from the record data voltage generation device to the dielectric material through the probe and a second line for sending the bias voltage from the voltage application device to the dielectric material.

According to this aspect, record data is applied to the probe when recording, and a DC voltage as being a bias voltage is applied to the probe when reproducing, by the switching device. When reproducing, it is possible to reproduce the data at high speed.

In another aspect of the dielectric recording/reproducing apparatus of the present invention, a combining device and a switching device may be added to the dielectric recording/reproducing apparatus. The combining device is a device for combining the recording voltage and the bias voltage. The switching device is a device for switching between a first line for sending the recording voltage and the bias voltage from the combining device to the dielectric material through the probe and a second line for sending the bias voltage from the voltage application device to the dielectric material.

According to this aspect, record data and a DC voltage, as being a bias voltage, which is combined with this record data are applied to the probe when recording, and a DC voltage as being a bias voltage is applied to the probe when reproducing. When recording, the apparatus can record data, and also reproduce data which is being recorded, and when reproducing, it is possible to reproduce data at high speed.

Incidentally, in the above-explained dielectric reproducing apparatus, dielectric recording apparatus, and dielectric recording/reproducing apparatus, with respect to the shape of the electrode for applying an electric field, a pin shape or needle-shape, the cantilever-shape, and the like are known as its specific structures. The electrode having these shapes is collectively referred to as the "probe" in the present application as occasion demands.

As the dielectric material, $LiTaO_3$ may be used, for example, which is a ferroelectric substance. The recording is performed with respect to the Z surface of the $LiTaO_3$, where a plus surface and a minus surface of the polarization are in a 180-degree domain relationship. Other dielectric materials may be used.

Moreover, the above-explained dielectric reproducing apparatus, dielectric recording apparatus, and dielectric recording/reproducing apparatus use a method of recording/reproducing information in/from the dielectric recording medium on the basis of the SNDM method. The SNDM technique is introduced in detail by the present inventor, Yasuo Cho, in Oyo Butsuri Vol. 67, No. 3, p 327 (1998). Namely, in this technique, the probe scans over a dielectric substance to detect the polarization state of the dielectric substance. The capacitance corresponding to the polarization direction is detected, and this corresponds to recorded data. The data is recorded by applying an electric field to the dielectric substance from the probe, or to the probe from a lower electrode formed in the dielectric substance and thus making the polarization to be in a predetermined direction. Extremely high-density recording becomes possible.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS (Embodiment of Dielectric Recording Apparatus)

Figure 1:
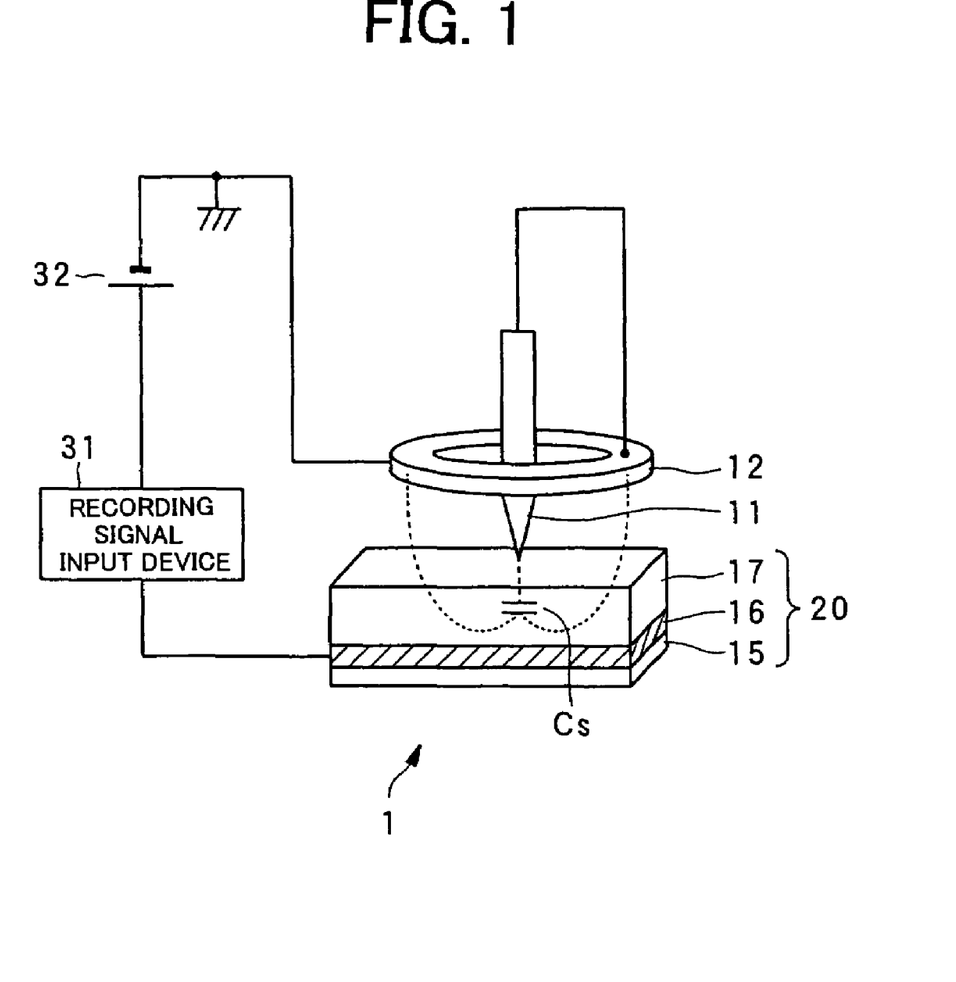
FIG. 1 is a schematic diagram showing the construction of an embodiment of a dielectric recording apparatus associated with the present invention.
Figure 2A:
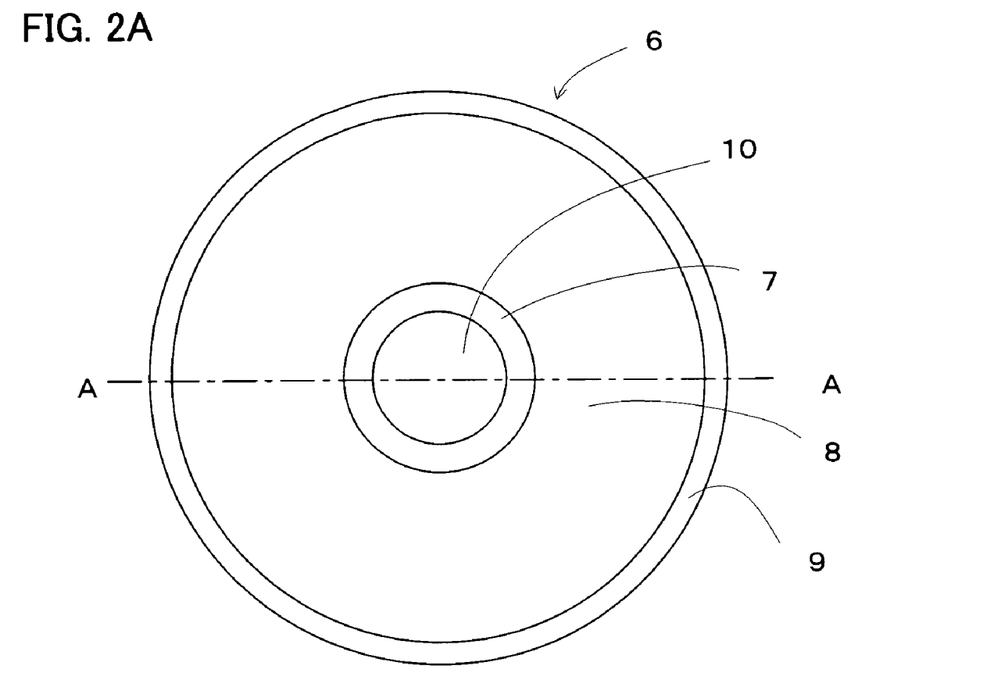
FIG. 2A is a plan view showing an example of a ferroelectric recording medium.
Figure 2B:
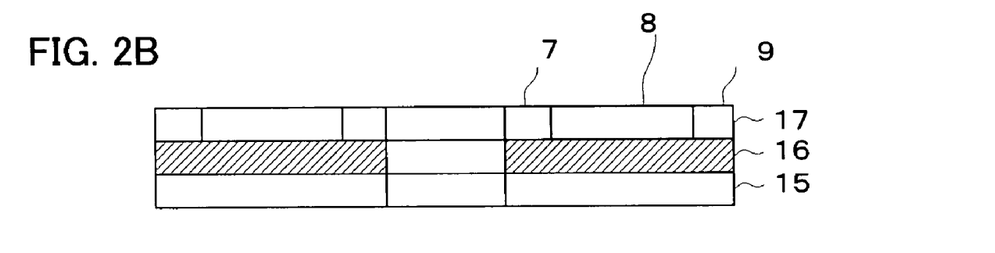
FIG. 2B is an A—A cross sectional view of FIG. 2A.
Figure 3:
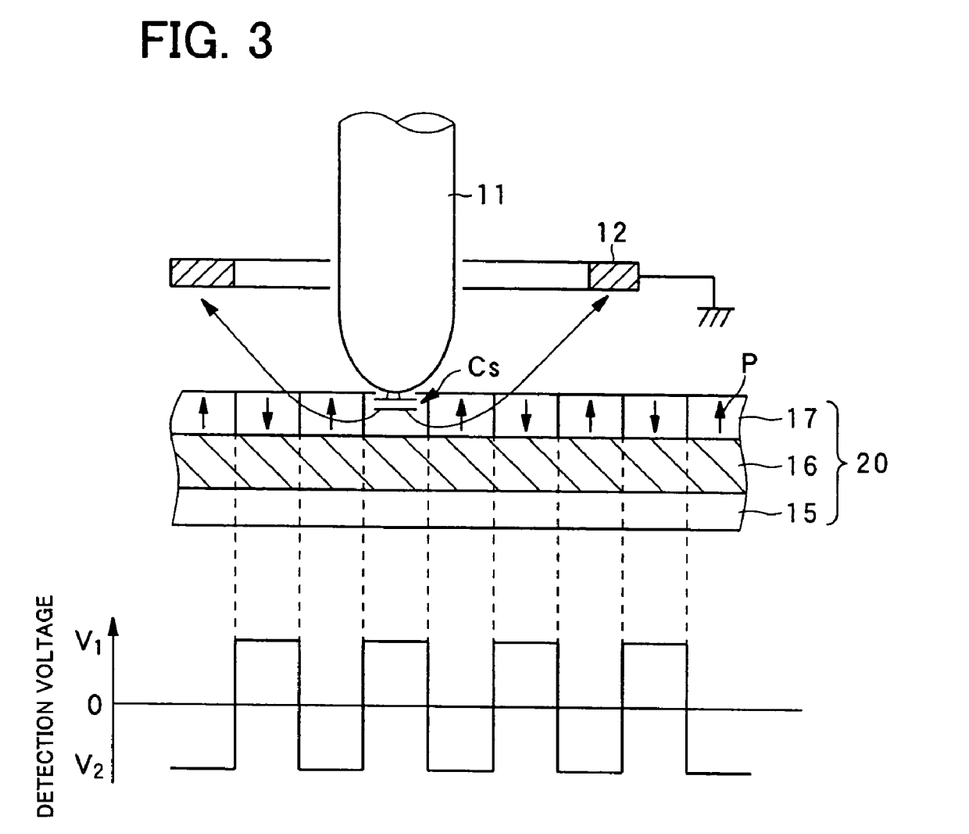
FIG. 3 is an explanatory diagram of the recording/reproducing of information with respect to a ferroelectric substance.
Figure 4A:
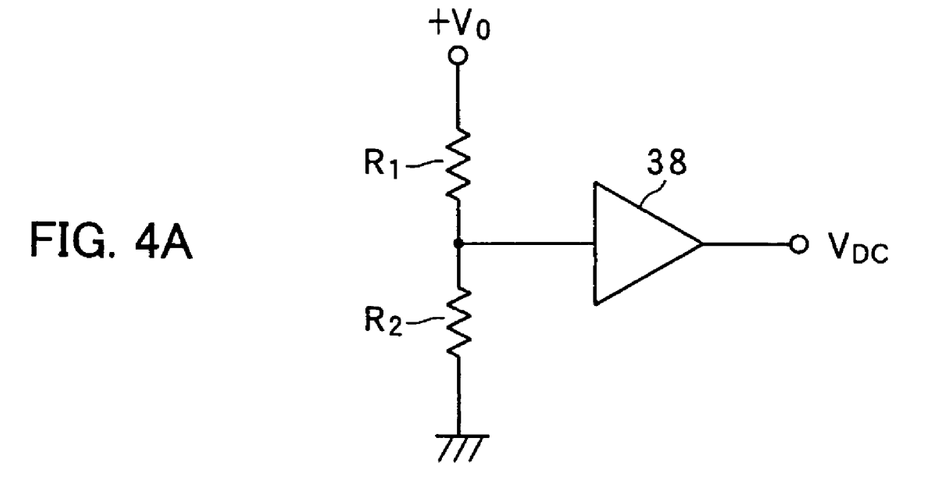
FIG. 4A and FIG. 4B are schematic diagrams each showing a generation device for generating a bias voltage associated with the present invention.
Figure 4B:
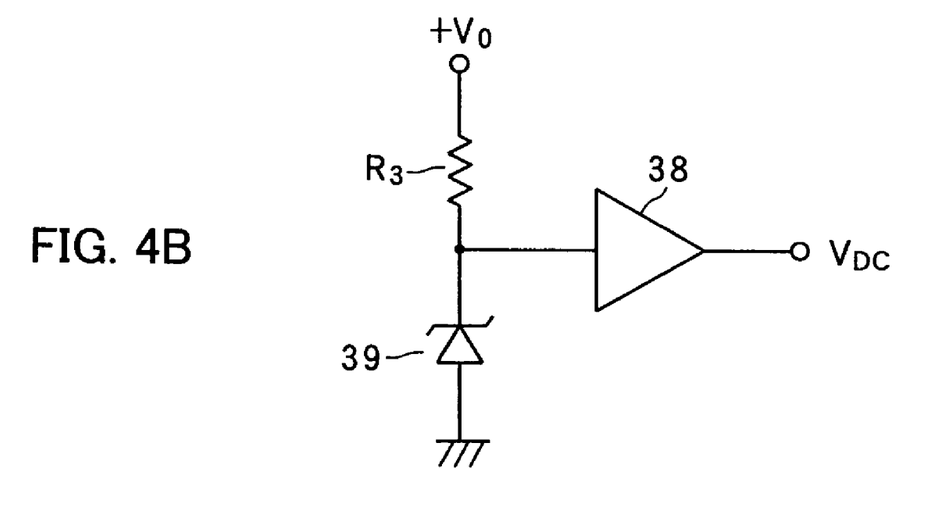
Figure 5A:
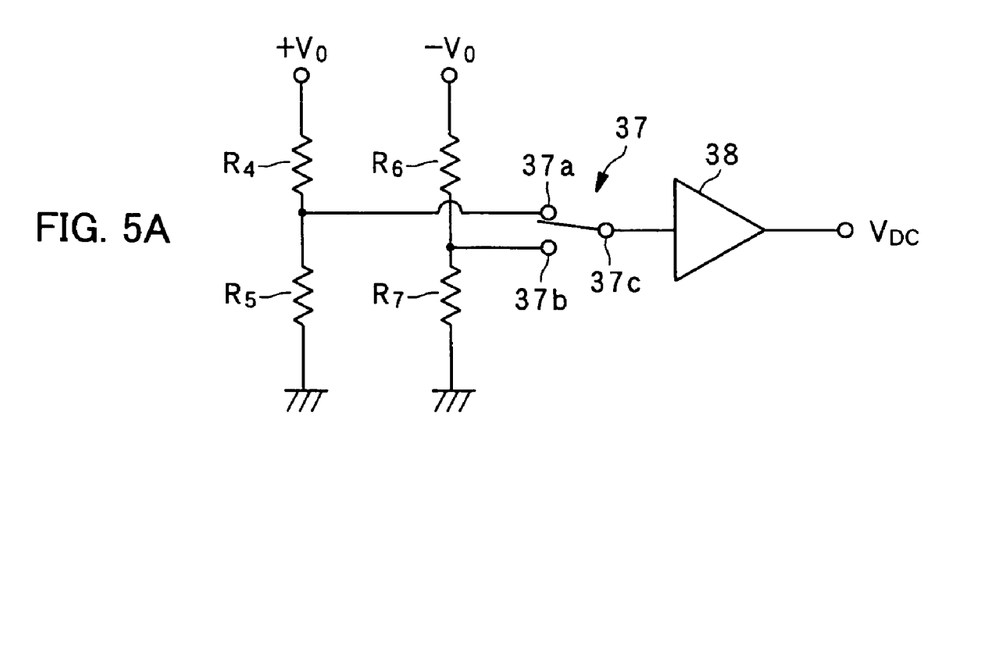
FIG. 5A and FIG. 5B are schematic diagrams each showing a generation device for generating a bias voltage associated with the present invention.
Figure 5B:
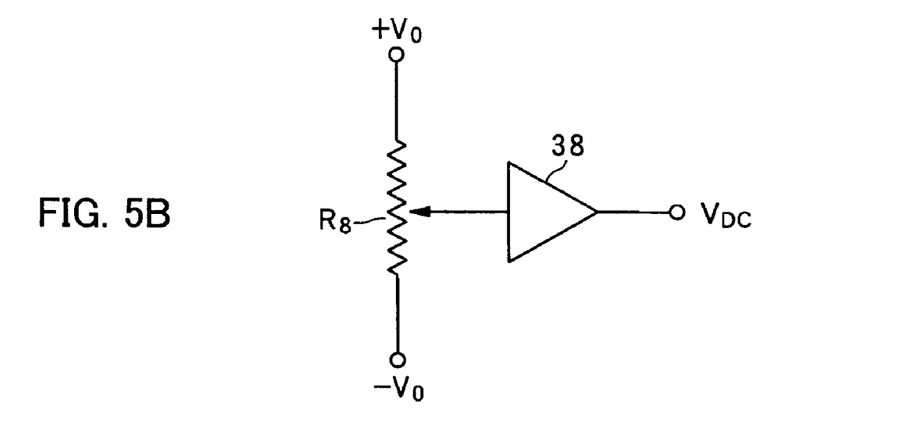

An embodiment of a dielectric recording apparatus associated with the present invention will be explained with reference to FIG. 1 to FIG. 5. FIG. 1 is a schematic diagram showing the construction of an embodiment of a dielectric recording apparatus associated with the present invention. FIG. 2A and FIG. 2B are views showing an example of a ferroelectric recording medium which is applied to the present invention. FIG. 3 is an explanatory diagram of the recording/reproducing of information with respect to a ferroelectric substance. FIG. 4 and FIG. 5 are schematic diagrams showing various types of generation device for generating a bias voltage associated with the present invention.

As shown in FIG. 1, a dielectric recording apparatus 1 associated with the present invention is provided with: a probe 11 for applying an electric field to a ferroelectric recording medium 20; a return electrode 12 for returning the applied high frequency electric field for data reproduction; a recording signal input device 31 for forming a recording signal corresponding to data to be recorded; a direct current (DC) voltage generator 32 for generating a DC bias voltage to be applied to the probe 11; or the like.

The probe 11 is a conductive member, or an insulating member coated with a conductive film. The tip portion facing to the ferroelectric material 17 is hemispherical, having a predetermined radius. This radius is an important factor in determining the radius of the polarization formed in the ferroelectric material 17 correspondingly to record data, so it is extremely small, on the order of 10 nm. Data is recorded by applying a voltage to this probe 11 to form domains polarized in predetermined directions in the ferroelectric material 17

The return electrode 12 is intended to use for data reproduction and is an electrode for returning a high frequency electric field for data reproduction applied to the ferroelectric material 17 from the probe 11. Not limited to the placement to surround the probe 11, as shown in FIG. 1, but any mode of the return electrode 12 can be used if shaped and placed to allow the return of the high frequency electric field without resistance.

The ferroelectric recording medium 20 is provided with: a substrate 15; an electrode 16 placed on the substrate 15; and the ferroelectric material 17 placed on the electrode 16. As the ferroelectric material 17, $LiTaO_3$ may be used, for example. As the shape of the ferroelectric recording medium 20, there are a disc form, a card form, or the like. The relative position movement to the probe 11 is performed by the rotation of the medium or by the linear movement of either the probe 11 or the medium.

The recording signal input device 31 converts data to be recorded in a recording format and adds the accompanying control information, to generate the recording signal. Processing about an error correction, processing of data compression, and the like are also included.

The DC voltage generator 32 generates a predetermined DC voltage in order to apply a DC bias voltage between the probe 11 and the ferroelectric material 17. This voltage is a voltage equal to or smaller than the coercive electric field of the ferroelectric material 17 and is superimposed onto to the recording signal. The DC voltage generator 32 has: a device for setting the value of a voltage which is generated; and a device for reversing polarity. Moreover, a battery with a predetermined voltage can be used.

The probe 11 touches the ferroelectric material 17, or faces to it with a small space. The recording signal is applied to the probe 11 by passing through the return electrode 12. By the application of the recording signal, the polarization direction of the ferroelectric material 17 on or under the tip portion of the probe 11 is set, and the data is recorded correspondingly to the polarization direction. The area that the tip portion of the probe 11 touches or faces to is very small, because this area is determined by the radius of the tip portion of the probe 11.

As explained above, in the embodiment, when data is recorded, a recording speed can be improved by applying a predetermined DC voltage between the probe 11 and the ferroelectric material 17. Moreover, as the recording signal is biased by the DC voltage, the electric field greater than the coercive electric field can be generated in the ferroelectric material 17, even if the amplitude of the recording signal is low. Therefore, a driver requires only a small driving capacity, and electromagnetic noise occurs less.

Next, one example of a ferroelectric recording medium which is applied to the present invention will be explained. As shown in FIG. 2A, a ferroelectric recording medium 6 is in a disc form and is provided with: a center hole 10; an inner area 7; a recording area 8; and an outer area 9, arranged concentrically from the inside in this order. The center hole 10 is used when attaching it to a spindle motor or the like.

The recording area 8 in which data is recorded has tracks and spaces, each of which is between two of the tracks, and the track and the space has areas in which control information about the recording/reproducing is recorded. The inner area 7 and the outer area 8 are used to recognize the inner and outer positions of the ferroelectric recording medium 6 and can be used as areas in which information about data is recorded, such as title, address, recording time, recording capacity, or the like. Incidentally, the above-described construction is one example of the ferroelectric recording medium, and it can take other constructions, such as a card form.

As shown in FIG. 2B, the ferroelectric recording medium 6 is provided with: the substrate 15; the electrode 16 laminated on the substrate 15; and the ferroelectric material 17 laminated on the electrode 16.

The substrate 15 may be Si, for example, which is a preferable material because of its strength, chemical stability, workability, and the like. The electrode 16 is intended to generate an electric field between the electrode 16 and the probe of a recording/reproducing head and applies to the ferroelectric material 17 an electric field stronger than the coercive electric field thereof to determine the polarization direction. Data is recorded by determining the polarization direction correspondingly to the data. Incidentally, the probe is an electrode, which is provided for the recording/reproducing head, for applying an electric field, and a pin shape or needle-shape, the cantilever-shape, and the like are known as its specific structures.

As the ferroelectric material 17, $LiTaO_3$ may be used, for example. The recording is performed with respect to the Z surface of the $LiTaO_3$, where a plus surface and a minus surface of the polarization are in a 180-degree domain relationship. Other ferroelectric materials may be used. In this ferroelectric material 17, the small polarization is formed at high speed by a voltage for data, which is applied together with the DC bias voltage.

The principle of recording/reproducing with respect to the ferroelectric recording medium 20 is as shown in FIG. 3. The ferroelectric recording medium 20 is provided with: the substrate 15; the electrode 16 placed on the substrate 15; and the ferroelectric material 17 placed on the electrode 16. The ferroelectric material 17 is associated with record data depending on the directions of polarizations.

When an electric field greater than the coercive electric field of the ferroelectric material 17 is applied between the probe 11 and the electrode 16, the ferroelectric material 17 is polarized, having directions corresponding to the direction of the applied electric field. The polarization direction corresponds to data. The reproduction is performed by detecting the capacitance Cs corresponding to the polarization state. The return electrode 12 is intended to use for data reproduction, is an electrode for returning the high frequency electric field for data reproduction applied to the ferroelectric material 17 from the probe 11, and is placed so as to surround the probe 11. Incidentally, the return electrode 12 may be in any form if shaped and placed to allow the return of the electric field from the probes 11 without resistance.

Next, the construction examples of a generation device for generating a DC voltage which is a bias voltage will be explained with reference to FIG. 4 and FIG. 5.

In FIG. 4A, a power supply voltage $+V_0$ is divided by a resistance R1 and a resistance R2 at a predetermined ratio, and the divided voltage is taken out from the connection point of the resistance R1 and the resistance R2 to input it to a buffer 38, thereby obtaining a bias voltage $V_{DC}$ with a low impedance output. The divided voltage is a voltage for generating an electric field equal to or smaller than the coercive electric field of the ferroelectric material, and the resistance values of the resistance R1 and the resistance R2 are determined on the basis of the power supply voltage $+V_0$.

In FIG. 4B, a bias voltage $V_{DC}$ is determined from a resistance R3 and a zener diode 39 and is inputted to the buffer 38 from the connection point of the resistance R3 and the zener diode 39, thereby obtaining the bias voltage $V_{DC}$ with a low impedance output. The bias voltage $V_{DC}$ is constant by virtue of the zener diode 39, in spite of the change of a power supply voltage $+V_0$. The bias voltage $V_{DC}$ is selected so as to be a voltage for generating an electric field equal to or smaller than the coercive electric field. Moreover, a predetermined stable voltage may be formed by dividing with resistances the voltage obtained by the zener diode 39.

FIG. 5A shows a generation device for generating a DC voltage provided with a function of reversing polarity. A power supply voltage $+V_0$ is divided by a resistance R4 and a resistance R5, and a power supply voltage $-V_0$ is divided by a resistance R6 and a resistance R7. The divided voltages are taken out from the connection point of the resistance R4 and the resistance R5 and the connection point of the resistance R6 and the resistance R7, and lead into a terminal 37a and a terminal 37b of a switch 37, respectively. They are inputted to the buffer 38, with either of the terminals 37a and 37b connected to a terminal 37c, thereby obtaining the bias voltage $V_{DC}$ with a low impedance output. By switching the terminals of the switch 37 correspondingly to the polarization direction to be recorded, the device can apply to the ferroelectric material an appropriate bias voltage corresponding to the polarization direction.

FIG. 5B shows a generation device for generating a DC voltage provided with a function of adjusting a bias voltage. A variable resistance R8 is connected between power supply voltages $+V_0$ and $-V_0$ and a voltage is inputted to the buffer 38 from a middle terminal between them, thereby obtaining a bias voltage Vdc with a low impedance output. The middle terminal can be moved, so that the device can adjust the bias voltage Vdc by the movement position. The device can easily set the bias voltage Vdc, depending on various ferroelectric materials with different coercive electric fields. Moreover, it is possible to reverse polarity by connecting the variable resistance R8 between the power supply voltages $+V_0$ and $-V_0$.

Incidentally, the generation device for generating a direct current bias voltage is not limited to the above-described construction, but can take any circuit construction including a battery.

(Embodiment of Dielectric Reproducing Apparatus)

Figure 6:
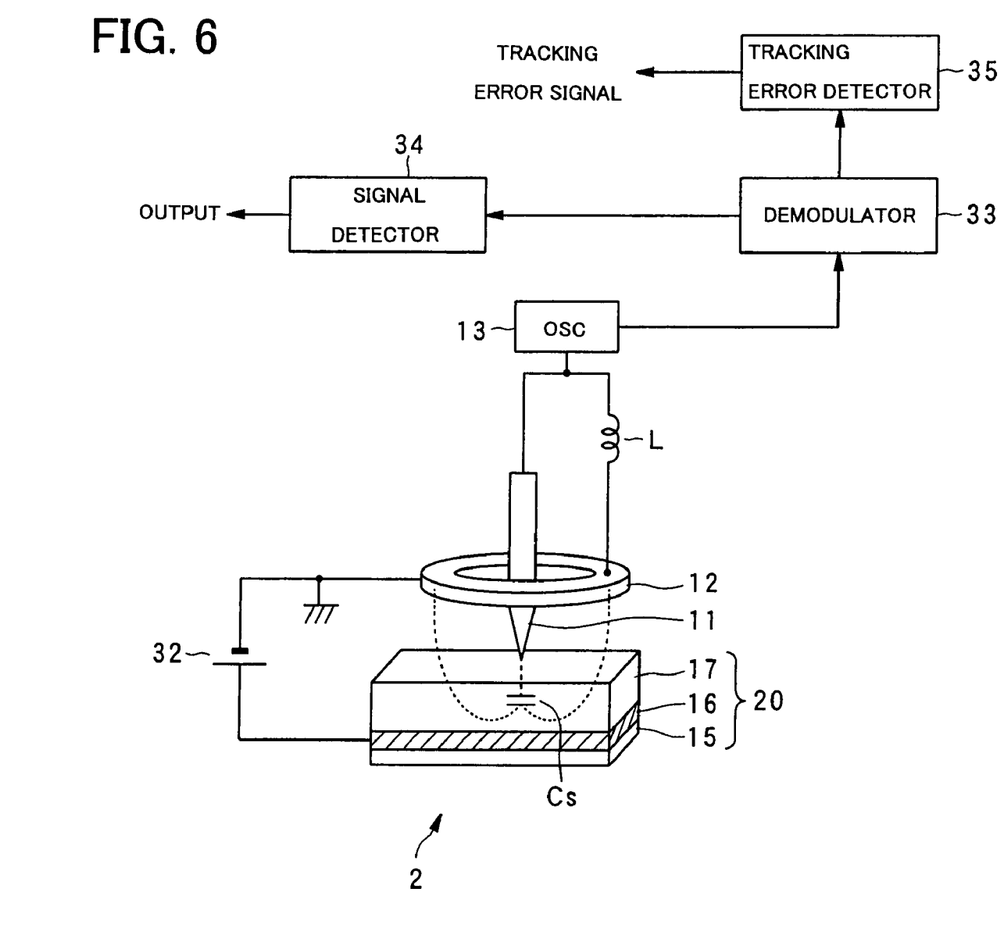
FIG. 6 is a schematic diagram showing the construction of an embodiment of a dielectric reproducing apparatus associated with the present invention.

An embodiment of a dielectric reproducing apparatus associated with the present invention will be explained with reference to FIG. 6.

A dielectric reproducing apparatus 2 is provided with: the probe 11 for applying an electric field with its tip portion facing to the ferroelectric material 17 of the ferroelectric recording medium 20; the return electrode 12 for returning the high frequency electric field for data reproduction applied from the probe 11; an inductor L placed between the probe 11 and the return electrode 12; an oscillator 13 which oscillates at a resonance frequency determined according to the inductor L and the capacitance Cs in a portion formed in the ferroelectric material 17 just under the probe 11 and polarized correspondingly to recorded data; the DC voltage generator 32 for generating a DC bias voltage to be applied to the probe 11; a frequency-amplitude demodulator 33 for demodulating an oscillation signal of the oscillator 13 having the frequency that is changed depending on the capacitance corresponding to the polarization state owned by the ferroelectric material 17 just under the probe 11; a signal detector 34 for detecting data from the demodulated signal; a tracking error detector 35 for detecting a tracking error signal from the demodulated signal; or the like.

The probe 11 is a conductive member, or an insulating member coated with a conductive film. The tip portion facing to the ferroelectric material 17 is hemispherical, having a predetermined radius. This radius is an important factor in determining the radius of the polarization formed in the ferroelectric material 17 correspondingly to record data, so it is extremely small, on the order of 10 nm.

The return electrode 12 is an electrode for returning a high frequency electric field applied to the ferroelectric material 17 from the probe 11, and is placed so as to surround the probe 11. Incidentally, if the high frequency electric field returns to the return electrode 12 without resistance, its shape and placement can be set arbitrarily.

The inductor L is placed between the probe 11 and the return electrode 12, and may be formed with a microstripline, for example. The inductor L and the capacitance Cs constitute a resonance circuit. The inductance of the inductor L is determined so that this resonance frequency, $f=1/\{2\pi \sqrt{(LCs)}\}$, is about 1 GHz, for example.

The oscillator 13 is an oscillator which oscillates at a frequency determined according to the inductor L and the capacitance Cs. The oscillation frequency varies, depending on the change of the capacitance Cs. Therefore, the change of the capacitance Cs determined depending on the polarization domain corresponding to recorded data is converted into the change of the oscillation frequency, so that it is possible to read the recorded data.

The probe 11 touches the ferroelectric material 17, or faces to it with a small space. The area that the tip portion of the probe 11 touches or faces to is defined according to the radius of the tip portion of the probe 11. Therefore, the area is very small. As only the polarization domain within this small area can be detected by the tip portion of the probe 11, the data reproduction can be performed in high resolution. In data reproduction, the capacitance Cs, which corresponds to the polarization in the ferroelectric material 17 on or under the tip portion of the probe 11, participates in the resonance circuit made with the inductance L. By this, the oscillation frequency comes to depend on the capacitance Cs. By demodulating the oscillation signal having the frequency that is changed depending on the capacitance Cs, a detection voltage shown in FIG. 3 is obtained, and the recorded data is reproduced.

The DC voltage generator 32 generates a predetermined DC voltage in order to apply a DC bias voltage between the probe 11 and the ferroelectric material 17. This voltage is a voltage equal to or smaller than the coercive electric field of the ferroelectric material 17. The DC voltage generator 32 also has: a device for setting the value of a voltage which is generated; a device for reversing polarity. Moreover, a battery with a predetermined voltage can be used as well.

The frequency-amplitude demodulator 33 demodulates the oscillation signal of the oscillator 13 having the frequency that is changed depending on the capacitance Cs, and reconstructs a wave form corresponding to the polarized state of a potion on which the probe 11 traces. If the recorded data is "0" and "1" digital data, the oscillation signal has two types of frequencies corresponding to "0" and "1". The data reproduction is easily performed by distinguishing these two frequencies.

The signal detector 34 reproduces the recorded data from the signal demodulated at the frequency-amplitude demodulator 33.

The tracking error detector 35 detects a tracking error signal for controlling the apparatus from the signal demodulated at the frequency-amplitude demodulator 33. The detected tracking error signal is inputted to a tracking mechanism to control the apparatus.

As explained above, in the embodiment, when data is reproduced, a reproducing speed can be improved by applying a predetermined DC voltage between the probe 11 and the ferroelectric material 17, and a signal with a good SN ratio can be obtained.

(First Embodiment of Dielectric Recording/Reproducing Apparatus)

Figure 7:
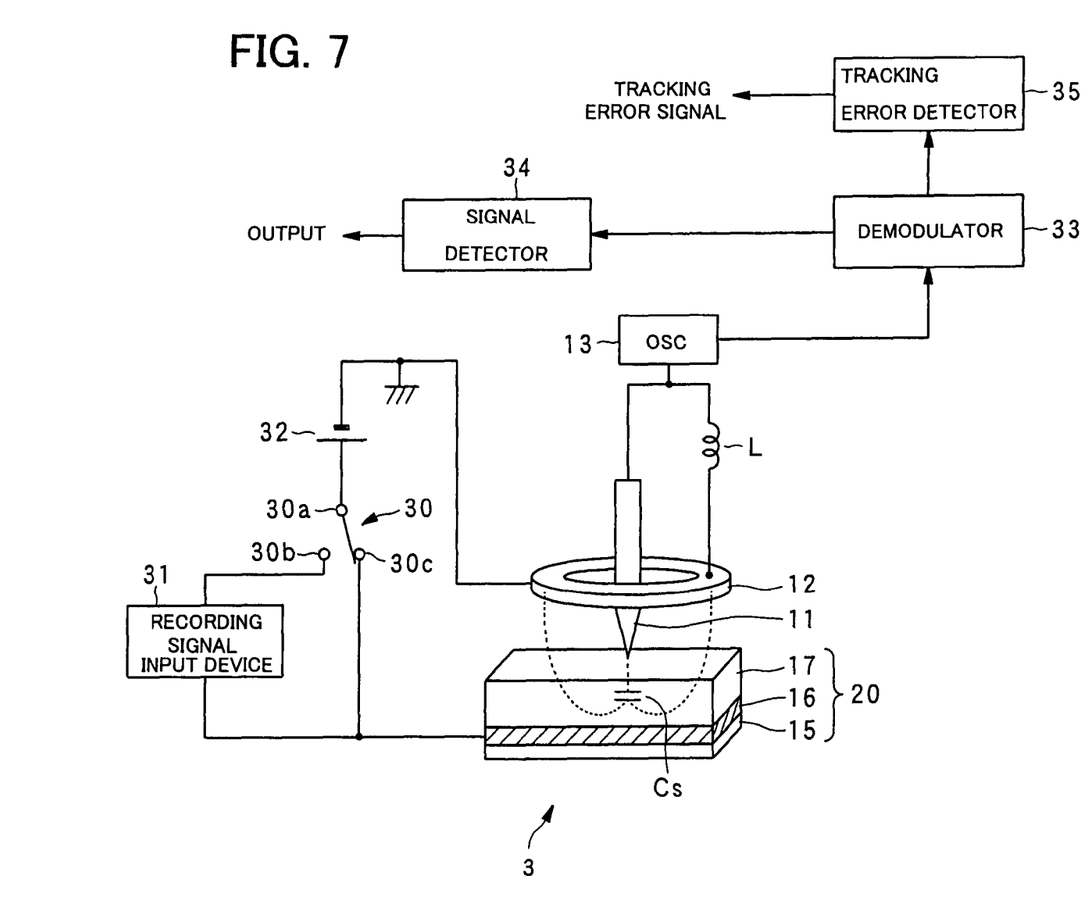
FIG. 7 is a schematic diagram showing the construction of a first embodiment of a dielectric recording/reproducing apparatus associated with the present invention.

A first embodiment of the dielectric recording/reproducing apparatus associated with the present invention will be explained with reference to FIG. 7.

A dielectric recording/reproducing apparatus 3 is provided with: the probe 11 for applying an electric field with its tip portion facing to the ferroelectric material 17 of the ferroelectric recording medium 20; the return electrode 12 for returning the electric field applied from the probe 11; the inductor L placed between the probe 11 and the return electrode 12; the oscillator 13 which oscillates at a resonance frequency determined according to the inductor L and the capacitance Cs in a portion formed in the ferroelectric material 17 just under the probe 11 and polarized correspondingly to recorded data; a switch 30 for switching circuit connections depending on whether the data recording is performed or the data reproduction is performed; the recording signal input device 31 for converting data to be recorded to generate a signal for recording; the DC voltage generator 32 for generating a DC bias voltage to be applied to the probe 11; a frequency-amplitude demodulator 33 for demodulating an oscillation signal of the oscillator 13 having the frequency that is changed depending on the capacitance corresponding to the polarization state owned by the ferroelectric material 17 just under the probe 11; the signal detector 34 for detecting data from the demodulated signal; the tracking error detector 35 for detecting a tracking error signal from the demodulated signal; or the like.

The dielectric recording/reproducing apparatus 3 has the both functions of recording and reproducing with respect to the ferroelectric recording medium 20, and has such a function of switching the circuit connections with the switch 30, depending on whether the data recording is performed or the data reproduction is performed. The apparatus 3 further has a function of applying a DC bias voltage when recording and reproducing. Other constitutional elements, their functions and effects are the same as those explained in the dielectric recording apparatus 1 and the dielectric reproducing apparatus 2, and their explanation is omitted.

When recording, the switch 30 connects a terminal 30a and a terminal 30b. Therefore, the DC voltage generator 32 is connected to the recording signal input device 31 so that a bias voltage is superimposed onto a recording signal. This allows the application of the DC bias voltage as well as the recording signal between the probe 11 and the ferroelectric material 17. Therefore, a recording speed can be improved. Moreover, as the recording signal is biased by the DC voltage, the electric field greater than the coercive electric field can be generated in the ferroelectric material 17, even if the amplitude of the recording signal is low. Therefore, a driver requires only a small driving capacity, and electromagnetic noise occurs less. Furthermore, it is also possible to reproduce data while recording, on the basis of the recording signal to which a DC voltage is added.

When reproducing, the switch 30 connects the terminal 30a and a terminal 30c to apply a DC bias voltage between the probe 11 and the ferroelectric material 17. Therefore, a reproducing speed can be improved, and a signal with a good SN ratio can be obtained.

(Second Embodiment of Dielectric Recording/Reproducing Apparatus)

Figure 8:
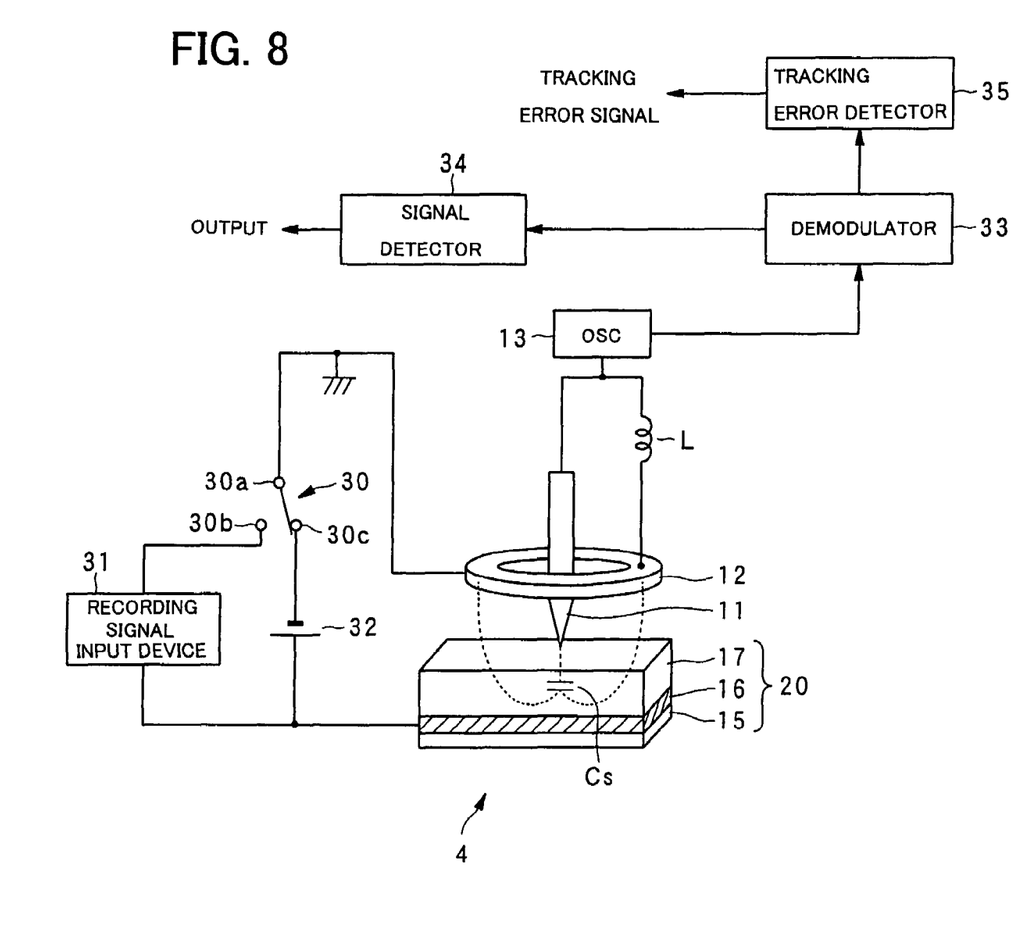
FIG. 8 is a schematic diagram showing the construction of a second embodiment of a dielectric recording/reproducing apparatus associated with the present invention.

A second embodiment of the dielectric recording/reproducing apparatus associated with the present invention will be explained with reference to FIG. 8.

A dielectric recording/reproducing apparatus 4 is provided with: the probe 11 for applying an electric field with its tip portion facing to the ferroelectric material 17 of the ferroelectric recording medium 20; the return electrode 12 for returning the high frequency electric field for signal reproduction applied from the probe 11; the inductor L placed between the probe 11 and the return electrode 12; the oscillator 13 which oscillates at a resonance frequency determined according to the inductor L and the capacitance Cs in a portion formed in the ferroelectric material 17 just under the probe 11 and polarized correspondingly to recorded information; the switch 30 for switching circuit connections depending on whether the data recording is performed or the data reproduction is performed; the recording signal input device 31 for converting data to be recorded to generate a signal for recording; the DC voltage generator 32 for generating a DC bias voltage to be applied to the probe 11; the frequency-amplitude demodulator 33 for demodulating an oscillation signal of the oscillator 13 having the frequency that is changed depending on the capacitance corresponding to the polarization state owned by the ferroelectric material 17 just under the probe 11; the signal detector 34 for detecting data from the demodulated signal; the tracking error detector 35 for detecting a tracking error signal from the demodulated signal; or the like.

The dielectric recording/reproducing apparatus 4 has the both functions of recording and reproducing with respect to the ferroelectric recording medium 20, and has a function of switching the circuit connections by the switch 30 depending on whether the data recording is performed or the data reproduction is performed. The apparatus 4 further has a function of applying DC bias voltage between the probe 11 and the ferroelectric material 17 when reproducing. Other constitutional elements, their functions and effects are the same as those explained in the dielectric recording apparatus 1 and the dielectric reproducing apparatus 2, and their explanation is omitted.

When recording, the switch 30 connects the terminal 30a and the terminal 30b to apply a recording signal from the recording signal input device 31 between the probe 11 and the ferroelectric material 17. On the other hand, when reproducing, the switch 30 connects the terminal 30a and the terminal 30c to apply a DC bias voltage between the probe 11 and the ferroelectric material 17. Therefore, a reproducing speed can be improved, and a signal with a good SN ratio can be obtained.

Incidentally, the dielectric recording/reproducing apparatuses 3 and 4 have such a circuit construction that the inductance of the inductor L, which constructs a resonance circuit, has a small effect on the frequency component of a recording signal as an inductance component, and they are in the mode that a voltage is applied between the probe 11 and the ferroelectric material 17 through the return electrode 12 and the inductor L. If the inductance has a large effect, it takes the following embodiment.

(Third Embodiment of Dielectric Recording/Reproducing Apparatus)

Figure 9:
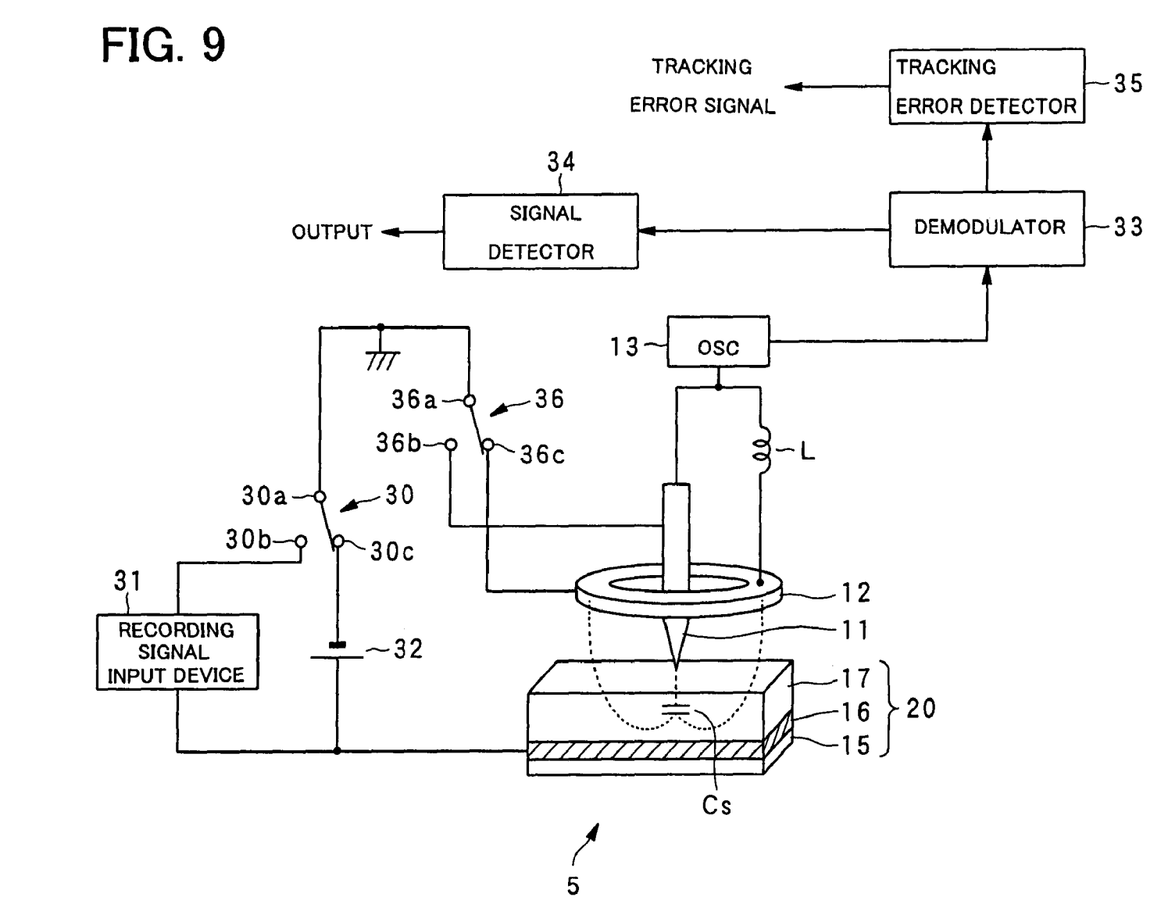
FIG. 9 is a schematic diagram showing the construction of a third embodiment of a dielectric recording/reproducing apparatus associated with the present invention.

A third embodiment of the dielectric recording/reproducing apparatus associated with the present invention will be explained with reference to FIG. 9. The third embodiment indicates an example in the case where the inductance of the inductor L has a large effect on the frequency component of a recording signal.

A dielectric recording/reproducing apparatus 5 is provided with: the probe 11 for applying an electric field with its tip portion facing to the ferroelectric material 17 of the ferroelectric recording medium 20; the return electrode 12 for returning the high frequency electric field for signal reproduction applied from the probe 11; the inductor L placed between the probe 11 and the return electrode 12; the oscillator 13 which oscillates at a resonance frequency determined according to the inductor L and the capacitance Cs in a portion formed in the ferroelectric material 17 just under the probe 11 and polarized correspondingly to recorded information; the switch 30 and a switch 36 for switching circuit connections depending on whether the data recording is performed or the data reproduction is performed; the recording signal input device 31 for converting data to be recorded to generate a signal for recording; the DC voltage generator 32 for generating a DC bias voltage to be applied to the probe 11; the frequency-amplitude demodulator 33 for demodulating an oscillation signal of the oscillator 13 having the frequency that is changed depending on the capacitance corresponding to the polarization state owned by the ferroelectric material 17 just under the probe 11; the signal detector 34 for detecting data from the demodulated signal; the tracking error detector 35 for detecting a tracking error signal from the demodulated signal; or the like.

The dielectric recording/reproducing apparatus 5 has the both functions of recording and reproducing with respect to the ferroelectric recording medium 20, and has a function of switching the circuit connections by the switch 30 and the switch 36 depending on whether the data recording is performed or the data reproducing is performed. The apparatus 5 further has a function of applying a DC bias voltage between the probe 11 and the ferroelectric material 17 when reproducing. Other constitutional elements, their functions and effects are the same as those explained in the dielectric recording apparatus 1 and the dielectric reproducing apparatus 2, and their explanation is omitted.

When recording, the switch 30 connects the terminal 30a and the terminal 30b, and the switch 36 connects a terminal 36a and a terminal 36b, to apply a recording signal from the recording signal input device 31 between the probe 11 and the ferroelectric material 17. The terminal 36b of the switch 36 is directly connected to the probe 11, so that it is possible to avoid the influence of the inductance of the inductor L.

On the other hand, when reproducing, the switch 30 connects the terminal 30a and the terminal 30c, and the switch 36 connects the terminal 36a and a terminal 36c, to construct a resonance circuit with the inductor L and the capacitance Cs. This also allows the application of a DC bias voltage between the probe 11 and the ferroelectric material 17. Therefore, a recording speed can be improved, and a signal with a good SN ratio can be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-265930 filed on Sep. 11, 2002 including the specification, claims, drawings and summary is incorporated herein by reference in its entirety.

What is claimed is:

1. A dielectric recording apparatus for recording data in a dielectric material, comprising:
   a probe for recording the data in the dielectric material;
   a record data voltage generation device for generating a voltage corresponding to the data;
   a bias voltage generation device for generating a bias voltage which is applied to the dielectric material, a polarity of the bias voltage being determined based on a polarization direction corresponding to the data to be recorded; and
   a voltage application device for combining the voltage corresponding to the data and the bias voltage and applying the combined voltage to the probe.

2. The dielectric recording apparatus according to claim 1, wherein the bias voltage is a direct current voltage which is equal to or smaller than a voltage corresponding to a coercive field of the dielectric material.

3. The dielectric recording apparatus according to claim 1, wherein the bias voltage generation device comprises a voltage-value setting device for changing and setting a value of the bias voltage.

4. The dielectric recording apparatus according to claim 1, wherein the bias voltage generation device comprises a reversing device for reversing polarity of the bias voltage.

5. The dielectric recording apparatus according to claim 1, wherein the dielectric material is a ferroelectric material.

6. A dielectric reproducing apparatus for reproducing data recorded in a dielectric material, comprising:
   a probe for detecting a polarization state of the dielectric material corresponding to the data;
   a data reproduction device for reproducing the data from the polarization state detected by the probe;
   a bias voltage generation device for generating a direct current bias voltage which is applied to the dielectric material; and
   a voltage application device for applying the bias voltage to the dielectric material.

7. The dielectric reproducing apparatus according to claim 6, wherein the bias voltage is a direct current voltage which is equal to or smaller than a voltage corresponding to a coercive electric field of the dielectric material.

8. The dielectric reproducing apparatus according to claim 6, wherein the bias voltage generation device comprises a voltage-value setting device for changing and setting a value of the bias voltage.

9. The dielectric reproducing apparatus according to claim 6, wherein the bias voltage generation device comprises a reversing device for reversing polarity of the bias voltage.

10. The dielectric reproducing apparatus according to claim 6, wherein the data reproduction device reproduces the data by detecting a capacitance of the dielectric material corresponding to the polarization state with the probe.

11. The dielectric reproducing apparatus according to claim 6, wherein the data reproduction device comprises:
   an oscillator for generating an oscillation signal having a frequency that changes depending on a capacitance of the dielectric material corresponding to the polarization state detected by the probe; and
   a frequency-amplitude converting device for performing a frequency-amplitude conversion on the oscillation signal.

12. The dielectric reproducing apparatus according to claim 6, wherein the dielectric material is a ferroelectric material.

13. A dielectric recording/reproducing apparatus for performing data recording and data reproducing by using a dielectric material as a recording medium, comprising:
   a probe for recording data to be recorded in the dielectric material and for detecting a polarization state of the dielectric material corresponding to data recorded in the dielectric material;
   a record data voltage generation device for generating a recording voltage corresponding to the data to be recorded;
   a data reproduction device for reproducing the data recorded in the dielectric material on the basis of the polarization state detected by the probe;
   a bias voltage generation device for generating a bias voltage which is applied to the dielectric material, the bias voltage being a direct current voltage in reproducing the data; and
   a voltage application device for applying the bias voltage to the dielectric material.

14. The dielectric record/reproducing apparatus according to claim 13, further comprising a switching device for switching between a first line for sending the recording voltage from the record data voltage generation device to the dielectric material through the probe and a second line for sending the bias voltage from the voltage application device to the dielectric material.

15. The dielectric record/reproducing apparatus according to claim 13, further comprising:
   a combining device for combining the recording voltage and the bias voltage; and
   a switching device for switching between a first line for sending the recording voltage and the bias voltage from the combining device to the dielectric material through the probe and a second line sending the bias voltage from the voltage application device to the dielectric material.

16. The dielectric recording/reproducing apparatus according to claim 13, wherein the bias voltage is a direct current voltage which is equal to or smaller than a voltage corresponding to a coercive electric field of the dielectric material.

17. The dielectric recording/reproducing apparatus according to claim 13, wherein said bias voltage generation device comprises a voltage-value setting device for changing and setting a value of the bias voltage.

18. The dielectric recording to/reproducing apparatus according to claim 13, wherein the bias voltage generation device comprises a reversing device for reversing polarity of the bias voltage.

19. The dielectric recording/reproducing apparatus according to claim 13, wherein the data reproduction device reproduces the data by detecting a capacitance of the dielectric material corresponding to the polarization state with the probe.

20. The dielectric recording/reproducing apparatus according to claim 13, wherein the data reproduction device comprises:
   an oscillator for generating an oscillation signal having a frequency that changes depending on a capacitance of the dielectric material corresponding to the polarization state detected by the probe; and
   a frequency-amplitude converting device for performing a frequency-amplitude conversion on the oscillation signal.

21. The dielectric recording/reproducing apparatus according to claim 13, wherein the dielectric material is a ferroelectric material.

* * * * *